(12) United States Patent
Thatipelli et al.

(10) Patent No.: US 7,343,477 B1
(45) Date of Patent: Mar. 11, 2008

(54) EFFICIENT READ AFTER WRITE BYPASS

(75) Inventors: Krishna Thatipelli, Fremont, CA (US);
Balakrishna Venkatrao, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 538 days.

(21) Appl. No.: 10/747,584

(22) Filed: Dec. 29, 2003

(51) Int. Cl.
*G06F 9/34* (2006.01)
(52) U.S. Cl. ..................................... 712/218
(58) Field of Classification Search ............... 712/218, 712/216
See application file for complete search history.

(56) References Cited

U.S. PATENT DOCUMENTS

| | | | | |
|---|---|---|---|---|
| 4,998,221 | A * | 3/1991 | Correale, Jr. | 365/189.07 |
| 5,724,538 | A * | 3/1998 | Morris et al. | 711/206 |
| 5,987,595 | A * | 11/1999 | Yoaz et al. | 712/216 |
| 6,058,472 | A * | 5/2000 | Panwar et al. | 712/218 |
| 6,263,404 | B1 * | 7/2001 | Borkenhagen et al. | 711/137 |
| 6,349,382 | B1 * | 2/2002 | Feiste et al. | 712/216 |
| 6,938,148 | B2 * | 8/2005 | Moore et al. | 712/216 |
| 6,970,996 | B1 * | 11/2005 | Green | 712/218 |
| 7,028,166 | B2 * | 4/2006 | Pickett | 712/216 |

OTHER PUBLICATIONS

Lennox, Jonathon and Schulzrinne, Henning, "Transporting User Control Information in SIP REGISTER Payloads", Internet Engineering Task Force Internet Draft, Oct. 31, 2000, pp. 1-12.
Nikolopoulos, Dmitris, "Advanced Computer Architecture Lecture 10 Limits to ILP, Vector Processing," Lecture Slides, Feb. 22, 2005, <downloaded from http://www.cs.wm.edu/~dsn/courses/654/lectures/lecture10.pdf on June 25, 2005> 10 pages.
Hennessy, John L. and Patterson, David A., "Computer Architecture A Quantitative Approach", Third Edition, 2003, pp. 177-178 and 184-189.

* cited by examiner

*Primary Examiner*—Eric Coleman
(74) *Attorney, Agent, or Firm*—Dorsey & Whitney LLP

(57) ABSTRACT

Predicting address matches between a read type operation and a write type operation based on address representations allows for efficient RAW bypass. The spatial locality characteristic of code allows for address match prediction with address representations that are smaller than the actual addresses, thus allowing for faster comparison. Operations for performing the RAW bypass commence upon predicting an address match. While these operations are being performed, other operations for verifying the prediction are performed. If the address match prediction is verified, then the RAW bypass has been performed without hindrance. If the address match is proved incorrect, then the corresponding read type operation is reissued and/or re-executed.

68 Claims, 11 Drawing Sheets

| FIELDS | DESCRIPTION |
|---|---|
| PA | PHYSICAL ADDRESS |
| R/W | OPERATION TYPE |
| ... | ... |
| IID | INSTRUCTION IDENTIFIER |
| SC_V | SCAM ARRAY VALID BIT |
| DATA | WRITE DATA |
| BEN | BYTE ENABLE |
| WRAP | WRAP BIT |
| VA | ADDRESS REPRESENTATION |

MEMORY DISAMBIGUATION BUFFER ENTRY
700

FIG. 7

EFFICIENT READ AFTER WRITE BYPASS

BACKGROUND

1. Field of the Invention

The present invention relates to the field of computer architecture. More specifically, the present invention relates to processing memory operations.

2. Description of the Related Art

Out-of-order processors issue and execute instructions out-of-order to gain performance benefits. However, data dependencies may exist between certain instructions and may require preservation of those dependencies. Violation of such data dependencies generally results in a data hazard. One typical data hazard is read-after-write (RAW).

A store instruction writes data into a designated memory location. A load instruction reads data from a designated memory location. If the store and load instructions are accessing the same memory location and the store instruction is older than the load instruction (i.e., the store instruction precedes the load instruction in the program sequence that includes these instructions), then the load instruction may depend on the store instruction, assuming there are no other intervening store instructions. An additional factor that affects dependency between instructions includes the size of the data being written or read. Since the store instruction can require more time than a load instruction, there is a possibility that the load instruction will access the memory location before the store instruction completes. If so, then the load instruction will access stale data. To resolve this RAW data hazard without losing the benefit of out-of-order processing, RAW bypass is performed. The data being written by the store instruction is passed to the load instruction before the store instruction actually writes it to the addressed memory location, or to a corresponding entry (e.g., a cache line) in a memory hierarchy. Unfortunately, detecting a RAW hazard typically consumes several cycles. In particular, several cycles are typically consumed determining if the store and load instructions designate the same address.

SUMMARY

It has been discovered that the spatial locality characteristic of code often allows for reliable address match prediction with an address representation that is smaller than the represented address. The address representations, which are smaller, can be compared faster than complete addresses. Since address representations can be compared more efficiently than the corresponding addresses, such as physical addresses, a misprediction does not negatively impact performance. By the time the addresses have been determined for comparison to verify a predicted address match, potential bypass data has already been indicated. Predicting address matches between read and write type operations facilitates an architectural design that performs RAW bypass within an efficient amount of time and improves performance.

According to some embodiments of the invention, a method of operating a processor comprises predicting a match between targets of a write type operation and a subsequently issued read type operation. The predicting is performed prior to availability of a resolved address target of the read-type operation and using a partial portion of a corresponding virtual address. The method also comprises bypassing data from the write-type operation to the read-type operation based on the predicted match, and validating the predicted match. In response to detection of a misprediction, the read-type operation is re-executed.

According to some embodiments of the invention, a memory disambiguation buffer predicts an address match between a read type operation and a write type operation and performs a read after write (RAW) bypass based on at least the address match prediction.

According to some embodiments of the invention, a method comprises determining if a read-type operation's first memory location information matches a write-type operation's first memory location information. The read-type operation's first memory location information is available prior to a second memory location information of the read-type operation. The method also comprises performing a RAW bypass for the read type operation with the write type operation's data based at least in part on the determining that the read type operation's first memory location matches the write-type operation's first memory location information.

According to some embodiments of the invention, a method of read after write (RAW) bypass comprises selecting a write type operation based on a predictive address match between a read type operation and the write type operation in a first clock cycle, and bypassing data of the write type operation for the read type operation in a second clock cycle.

According to some embodiments of the invention, a processor predicts address matches with first address representations that can be compared prior to availability of corresponding second address representations. The processor also performs read after write bypass based at least in part on address match predictions of the first address representations.

According to some embodiments of the invention, an apparatus comprises a register file, and a memory operations buffer coupled to the register file, the memory operations buffer to perform read after write (RAW) bypass based at least in part on predictive address matches with partial addresses between read type operations and write type operations.

According to some embodiments of the invention, an apparatus comprises one or more queues to host read and write type memory operations, and means for predicting an address match between a write type memory operation and a read type memory operation and for performing read after write bypass based on the predicted address match.

According to some embodiments of the invention, an apparatus comprises a memory buffer that includes, a plurality of entries to store memory operations, a first sub-block to predict address matches between an incoming read type operation and resident write type operations that are older than an incoming read type memory operation, and a youngest picker to select a write type operation as a youngest of write type operations that are older than the incoming read type memory operation. The apparatus also comprises an execution unit.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 3A depicts a flowchart for providing a computed complete address according to some realizations of the invention. FIG. 3B depicts a flowchart for verifying an address match prediction with computed addresses according to some realizations of the invention.

FIG. 7 depicts a table describing an exemplary memory disambiguation buffer entry according to some realizations of the invention.

The use of the same reference symbols in different drawings indicates similar or identical items.

DESCRIPTION OF THE PREFERRED REALIZATION(S)

The description that follows includes exemplary systems, methods, techniques, instruction sequences and computer program products that embody techniques of the present invention. For instance, the present invention is described in some detail with exemplary implementations of a memory disambiguation buffer and a data hazard resolution unit. However, it is understood that the described invention may be practiced without these specific details. Particular instances of implementations suited for embodying efficient RAW bypass in one or more units that are aware of data dependencies between read type and write type operations are described. Such a unit may be referred to as a memory disambiguation buffer, memory reorder buffer, data hazard resolution unit, memory instruction buffer, memory operations buffer, etc. In other instances, well-known protocols, structures and techniques have not been shown in detail in order not to obscure the invention.

Prediction Based RAW Bypass

Figure 1:
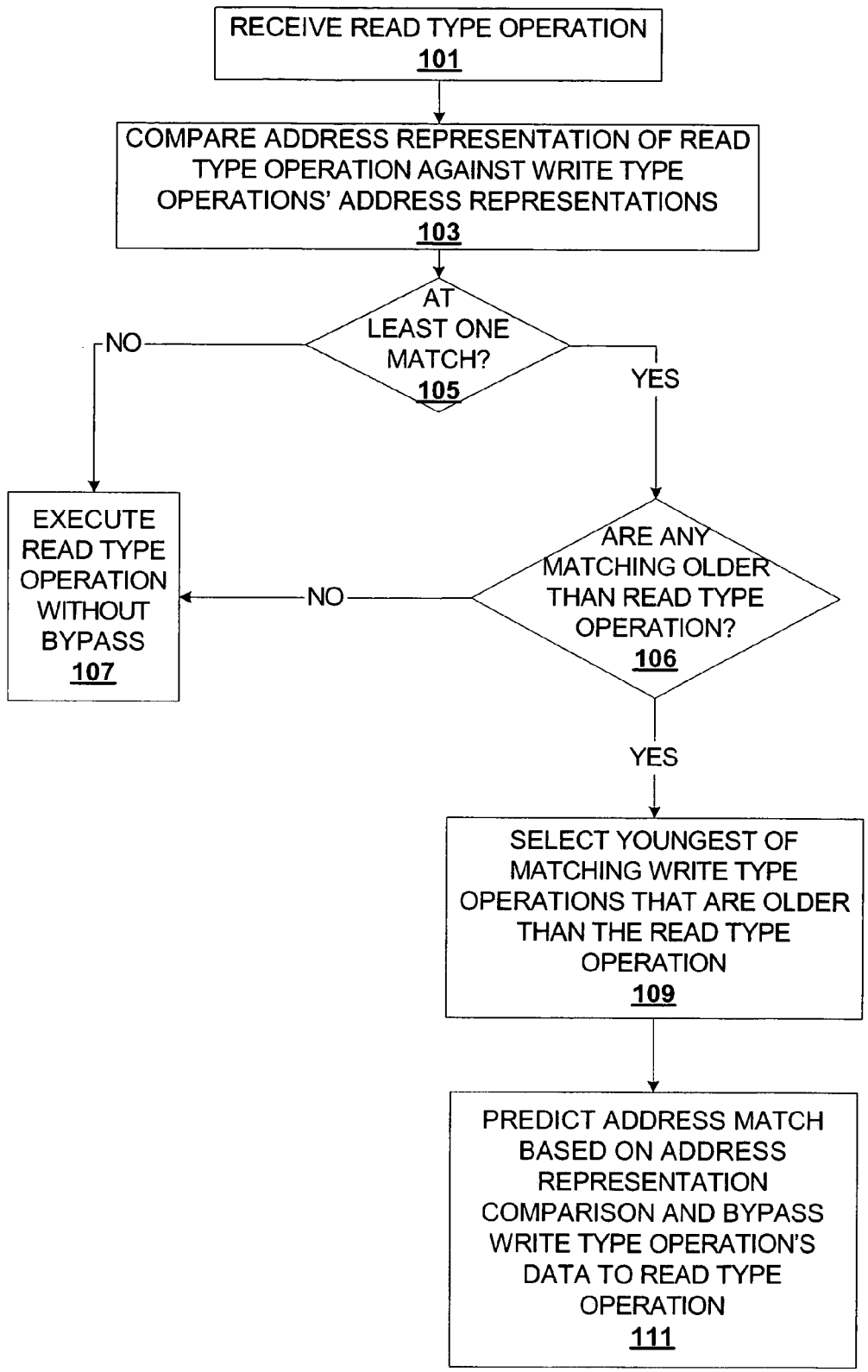
FIG. 1 depicts a flowchart for efficient read after write bypass according to some realizations of the invention.

FIG. 1 depicts a flowchart for efficient read after write bypass according to some realizations of the invention. At block 101, a read type operation (e.g., a load operation) is received. At block 103, an address representation of the read type operation is compared against address representations of write type operations (e.g., store operations). The address representation represents an actual address with less information than the actual address. For example, a subset of a virtual address represents a physical address. Various realizations of the invention will utilize different techniques for representing addresses (e.g., virtual addresses, address tags, compressed addresses, etc.). In addition, realizations of the invention use different techniques for comparing address representations (e.g., iterative comparison, a content addressable memory, a summing content addressable memory, etc.). Address representations may also be referred to as address targets, memory locations, etc. At block 105, it is determined if at least one write type operation's address representation matches the read type operation's address representation. If at least one write type operation matches the read type operation's address representation, then control flows to block 106. If none of the write type operations' address representations match the read type operation's address representation, then control flows to block 107.

At block 106, it is determined if any one of the matching write type operations are older than the read type operation. Various realizations of the invention indicate age of operations differently (e.g., indices, time stamps, physical location, etc.). If none of the matching write type operations are older than the read type operation, then control flows to block 107. If at least one of the matching write type operations is older than the read type operation, then control flows to block 109.

At block 107, the read type operation is executed without bypass data. For example, the read type operation is executed with data from L1 cache, L2 cache, memory, etc.

At block 109, the youngest of the matching older write type operations is selected. The matching write type operations are older than the read type operation, but the youngest of these older write type operations will provide the most current data. Control flows from block 109 to block 111.

At block 111, an address match is predicted based on the address representation comparison, and the matching write type operation's data is bypassed to the read type operation. If it is later determined that the prediction was incorrect, then a replay signal is generated. The replay signal will be discussed in more detail later herein.

Due to spatial locality, address matches of read and write type operations with less than complete addresses (e.g., a small number of bits of their virtual address) can be predicted with a high degree of accuracy and allows for reliable RAW bypass that will incur few penalties from infrequent mispredictions. This relatively small misprediction penalty and the more efficient comparison of address representations that are smaller than their corresponding addresses allows a technique for efficient RAW bypass.

The following Figure illustrates efficient RAW bypass in the context of cycle time. The number of cycles is meant to aid in understanding the described invention and not meant to be limiting upon the described invention. Those of ordinary skill in the art will appreciate that the described invention can be implemented in a variety of processor architectures and provide the efficiency of predictive address match based RAW bypass regardless of platform specific cycles to perform certain operations.

Figure 2:
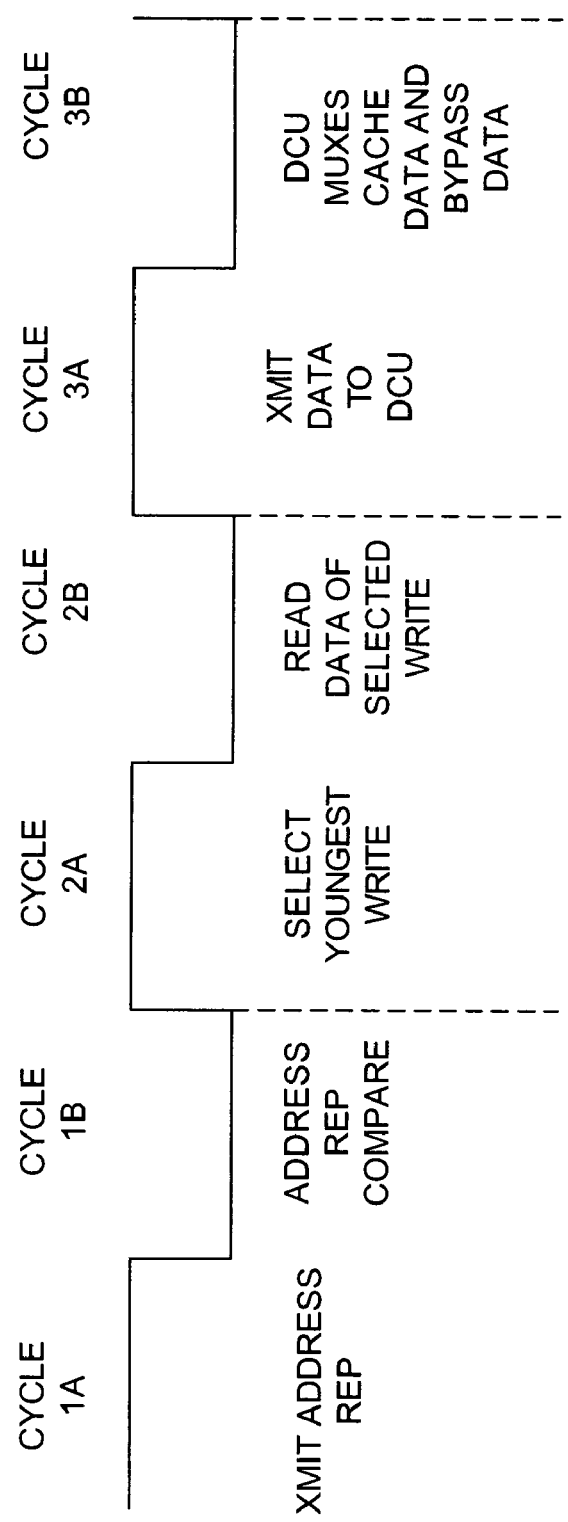
FIG. 2 depicts a time diagram illustrating efficient RAW bypass according to some realizations of the invention.

FIG. 2 depicts a time diagram illustrating efficient RAW bypass according to some realizations of the invention. In cycle 1A, an address representation (e.g., bits 12 . . . 3 of a virtual address) is transmitted to a memory buffer that implements efficient RAW bypass. The VA[12 . . . 3] is used as an illustration since these bits correspond to pages, but various realizations utilize address representation correspondence with various logical blocks of memory within virtual addressing and with other addressing schemes. In cycle 1B, address representation comparison is performed. In cycle 2A, the youngest matching write type operation is selected. In cycle 2B, data of the selected write type operation is read. In cycle 3A, the data is transmitted to an data cache unit (DCU). In cycle 3B, the DCU selects either the RAW bypass data or cache data (e.g., the DCU multiplexes the cache data and the bypass data).

As illustrated in FIGS. 1 and 2, performing a RAW bypass based on a predicted address match allows efficient performance of RAW bypass. The operations for performing RAW bypass are not delayed by a complete physical address comparison. Without the delay of a complete address comparison, the operations for performing RAW bypass can begin as soon as a RAW hazard is detected. In addition, address match prediction based RAW bypass facilitates an architectural design that matches latency of units involved with RAW bypass (e.g., matching latency of a MDB to latency of a DCU).

Verification of Address Match Prediction

Although a relatively high percentage of RAW hazard predictions are accurate, predicted address matches are verified to address the few mispredictions that occur. The few mispredictions can be resolved by replaying read type operations without impacting performance. Since prediction based RAW bypass completes at approximately the same time that addresses are available for comparison, a replay caused by a RAW bypass misprediction will not negatively impact performance.

Figure 3A:
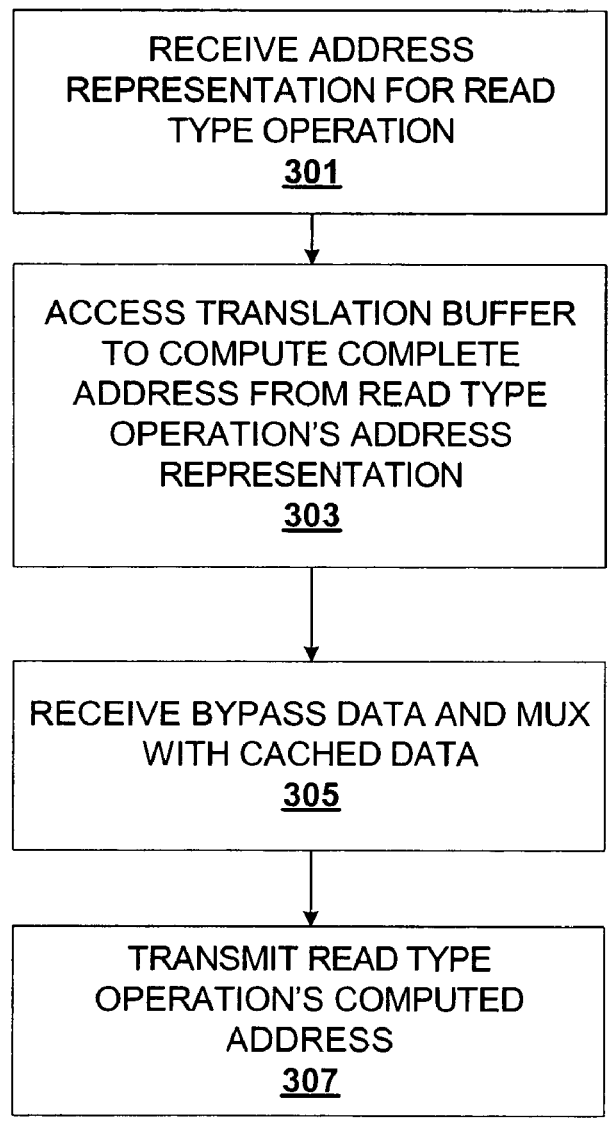
FIGS. 3A-3B depict flowcharts for verifying an address match prediction according to some realizations of the invention.
Figure 3B:
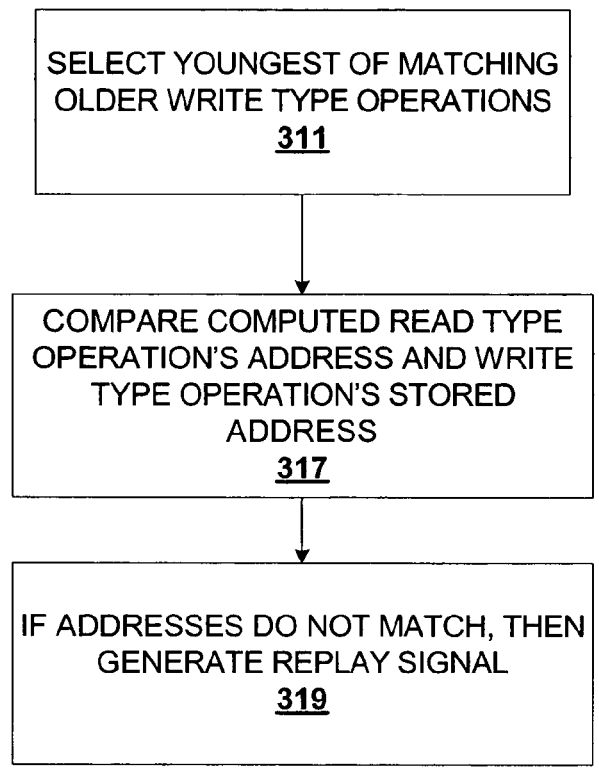

FIGS. 3A-3B depict flowcharts for verifying an address match prediction according to some realizations of the invention. FIG. 3A depicts a flowchart for providing a computed complete address according to some realizations of the invention. For example, a DCU as discussed in FIGS. 1-2 performs the operations of FIG. 3A. At block 301, an address representation for a read type operation is received. At block 303, a translation buffer is accessed to compute the complete address from the received read type operation's address representation. At block 305, RAW bypass data is received and muxed with cached data. In various realizations of the invention, the DCU muxes additional data (e.g., the bypass data, the cache data, level 2 cache data, etc.). A control signal will indicate to the DCU which data to transmit (e.g., a signal from the memory disambiguation buffer, from the DCU, from the L2 cache, from the memory scheduling window, etc.). At block 307, the computed address for the read type operation is transmitted, for example from a DCU to an MDB.

FIG. 3B depicts a flowchart for verifying an address match prediction with computed addresses according to some realizations of the invention. For example, an MDB as discussed in FIGS. 1-2 performs the operations illustrated in FIG. 3B. At block 311, the youngest of the matching older write type operations is selected, similar to block 109 of FIG. 1. At block 317, the computed read type operation's address is compared against the write type operation's stored address (previously computed and stored). As with address representations, realizations of the invention use different techniques for comparing addresses (e.g., iterative comparison, a content addressable memory, a summing content addressable memory, a lookup table, etc.). At block 319, a replay signal is generated if the computed addresses do not match. The operations illustrated in FIGS. 3A-3B include accessing a translation buffer to compute complete addresses, but realizations of the invention are not so limited. Various realizations of the invention employ various techniques and/or mechanisms to compute complete addresses (e.g., translating a virtual address to a physical address, translating a partial virtual address to a physical address or a complete virtual address, etc.).

Figure 4:
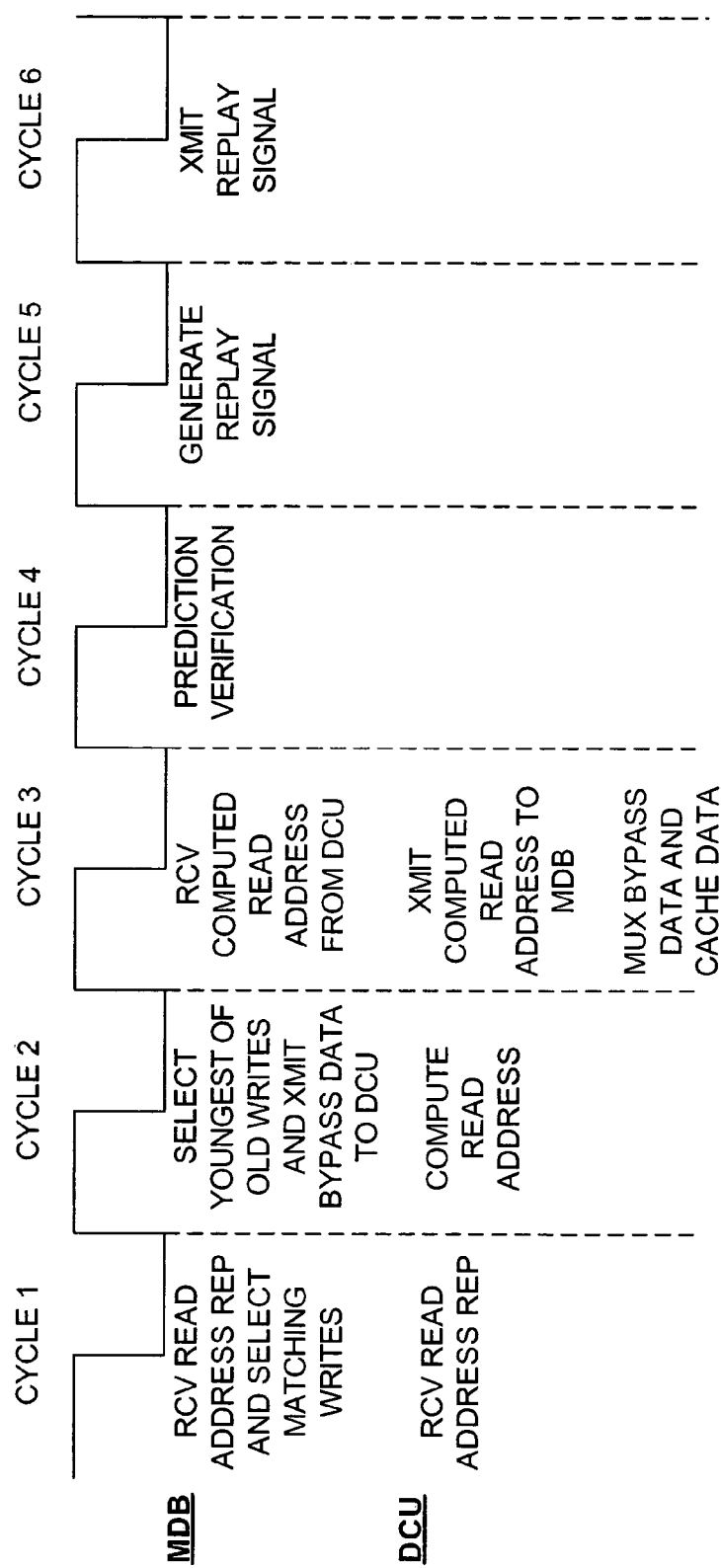
FIG. 4 depicts a time diagram illustrating RAW bypass replay according to some realizations of the invention.

FIG. 4 depicts a time diagram illustrating RAW bypass replay according to some realizations of the invention. In a cycle 1, an MDB receives an address representation of a read type operation and selects write type operations with matching address representations. In the same cycle, a DCU also receives the read type operation's address representation. In cycle 2, the MDB selects the youngest of the older matching write type operations and transmits the data of the selected write type operation (i.e., the bypass data) to the DCU. Also in cycle 2, the DCU computes, or causes to be computed, the address from the received address representation. In cycle 3, the DCU transmits the computed read type operation's address to the MDB and multiplexes cached data and the bypass data received from the MDB. The MDB receives the computed read type operation's address from the DCU and computes or causes to be computed the address of the selected write type operation in cycle 3. It can be seen in FIG. 4 that the efficiency provided by performing RAW bypass based on address match prediction allows for the MDB to detect a RAW hazard and provide bypass data to the DCU while the DCU contemporaneously computes the corresponding address from the address representation and provides the computed address for verification of the MDB's predicted match. Various realizations of the invention will implement the described invention differently, which may result in fewer or greater cycles to perform the described operations and/or different functional units to perform operations including those described herein. In cycle 4, the MDB verifies the address match prediction by comparing the computed addresses. In cycle 5, a replay signal is generated if the address match prediction is determined to be a misprediction. In cycle 6, the generated replay signal is transmitted.

In addition to verifying predictions, various realizations of the invention predicate RAW bypass on other factors in addition to address match prediction, such as matching data sizes.

Figure 5:
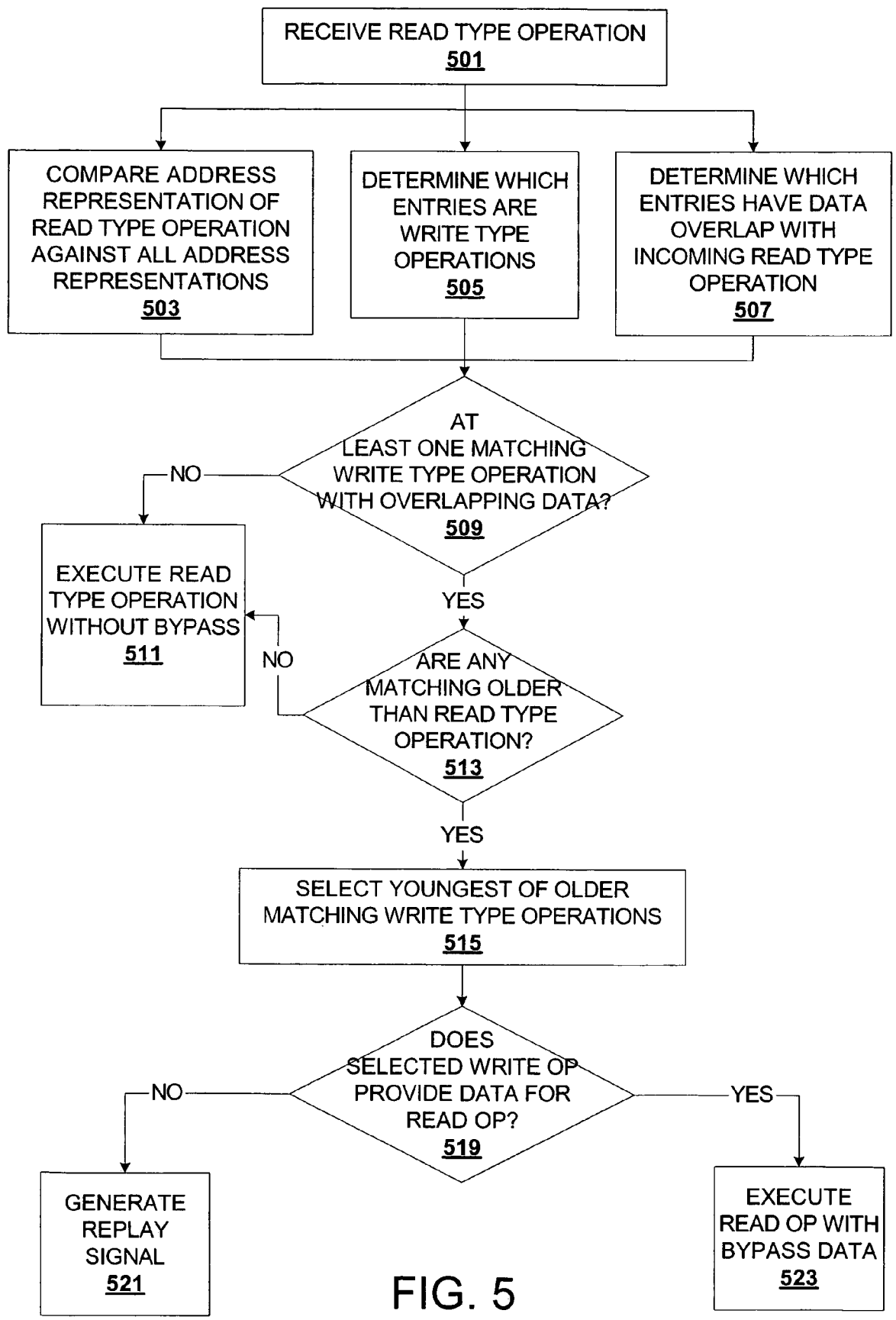
FIG. 5 depicts a flowchart for RAW bypass based on address match prediction and data size matching according to some realizations of the invention.

FIG. 5 depicts a flowchart for RAW bypass based on address match prediction and data size matching according to some realizations of the invention. At block 501, a read type operation is received. Control flows from block 501 to blocks 503, 505, and 507. At block 503, the received read type operation's address representation is compared against address representations, for example, of all entries in a MDB. At block 505, the entries that are write type operations are determined. At block 507, the entries having data that overlaps with the read type operation's requested data are determined (i.e., whether the operations will provide enough data for the read type operation). For example, if the read type operation is a load operation for a word, then it is determined if operations in the MDB provide at least a word of data. An example technique uses byte enable bits of memory operations. The byte enable bits indicates which bits are enabled for a particular memory operations, such as whether the memory operation involves a word, a byte, etc. The exemplary technique AND's the byte enable bits of the memory operations, OR's the results of the AND, and uses the result to determine if data overlaps.

At block 509, it is determined if there is at least one matching write type operation with overlapping data. If there is at least one matching write type operation with data that overlaps, then control flows to block 513. If there is not at least one matching write type operation with data that overlaps, then control flows to block 511.

At block 511, the read type operation is executed without bypass data (e.g., with data from memory, L1 cache, L2 cache, etc.).

At block 513, it is determined if any of the matching write type operations are older than the read type operation. If none of the matching write type operations are older than the read type operation, then control flows to block 511. If there is a matching write type operation that is older than the read type operation, then control flows to block 515.

At block 515, the youngest of the matching older write type operations is selected. At block 519, it is determined if the selected write type operation provides the data for the read type operation (e.g., determine if the write type operation writes the word of data being requested by the read type operation). If the selected write type operation does not provide the data requested by the read type operation (fails a byte enable check), then control flows to block 521. If the selected write type operation provides the data requested by the read type operation, then control flows to block 523. Although address representations for the read type operation and the selected write type operation match and have overlapping data, the data being written by the write type operation may not completely overlap or may not include the data being requested by the read type operation.

At block 521, a replay signal is generated is the byte enable check fails.

At block 523, the read type operation is executed with the RAW bypass data. Although the overlap check is described as a preliminary check to eliminate write type operations that do not include the data of the read type operation, the overlap check can be performed at different times (e.g., in parallel with the address compare).

While the flow diagrams show a particular order of operations performed by certain realizations of the invention, it should be understood that such order is exemplary (e.g., alternative realizations may perform the operations in a different order, combine certain operations, overlap certain operations, perform certain operations in parallel, etc.). For example, in FIG. 1 the operations of blocks 105 and 106 may be combined, block 106 may indicate all operations that are older than the read type operation in parallel with block 105, etc. In FIGS. 3A-3B, for example, the operations of blocks 303 and 305 may be combined, blocks 301 and 303 may be combined, blocks 311 and 313 may be combined or be performed in parallel, etc. In FIG. 5, for example, the operations of blocks 509 and 513 may be combined, blocks 503, 505 and 507 may be performed sequentially or combined, etc.

Exemplary System

A variety of techniques can be utilized to implement the described invention and the described invention can be implemented on a variety of platforms. An exemplary system is described below to illustrate the described invention, but the exemplary system is meant to aid in understanding the invention and not meant to be limiting upon the invention.

Figure 6:
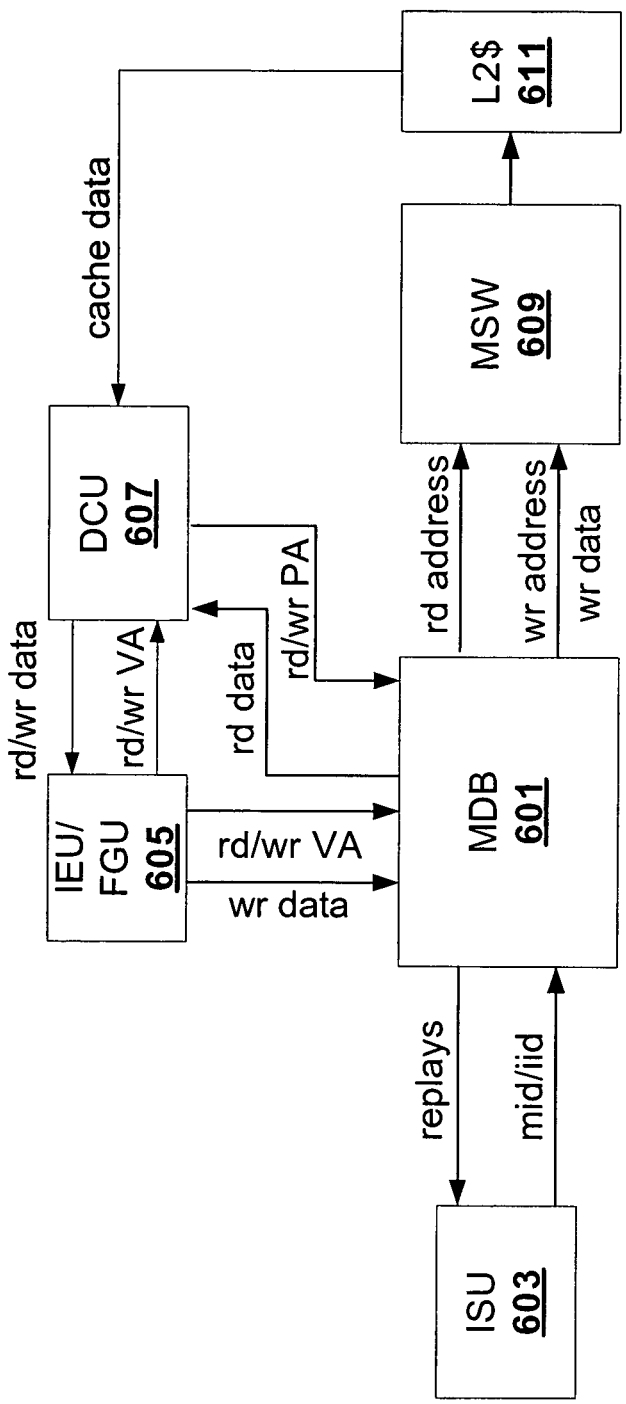
FIG. 6 depicts an exemplary system with a memory disambiguation buffer that performs prediction based RAW bypass according to some realizations of the invention.

FIG. 6 depicts an exemplary system with a memory disambiguation buffer that performs prediction based RAW bypass according to some realizations of the invention. A memory disambiguation buffer 601 is coupled with an instruction scheduling unit (ISU) 603, an instruction execution unit/floating point unit (IEU/FGU) 605, a data cache unit (DCU) 607, and a memory scheduling window (MSW) 609. The MSW 609 is also coupled with a level 2 cache 611. The level 2 cache 611 is coupled with the DCU 607. Realizations of the invention may include additional or fewer units that are not illustrated in FIG. 6.

The MDB and its surrounding units exchange various signals and data. The MDB 601 transmits replay signals, possibly resulting from a misprediction, failed byte enable check, etc., to the ISU 603. The ISU 603 transmits a MDB index (mid) associated with each memory operation and an instruction identifier (iid) to the MDB 601, both of which are used to determine age of operations in various scenarios (e.g., the mdb is used to determine age for operations when performing RAW bypass and the iid is used when performing operations related to retiring operations from the MDB). The MDB 601 transmits read data (bypass data) to the DCU 607. The MDB 601 transmits addresses of read and write type operations to the MSW 609. The MDB 601 transmits data of write type operations to the MSW 609. The IEU/FGU 605 transmits data for write type operations to the MDB 601 to be written into the MDB 601. The IEU/FGU 605 also transmits virtual addresses for read and write type operations to both the MDB 601 and the DCU 607. The DCU 607 provides data from read type operations (e.g., bypass data) and write type operations. The L2 cache 611 transmits data to the DCU 607.

FIG. 7 depicts a table describing an exemplary memory disambiguation buffer entry according to some realizations of the invention. A memory disambiguation buffer entry 700 includes several fields. Although an MDB entry may include additional information, FIG. 7 is limited to the illustrated information in order avoid confusion and aid in understanding the described invention. A PA field indicates the physical address for a memory operation. An R/W field indicates the type of a memory operation. An IID field indicates the instruction identifier. A SC_V field indicates a SCAM array valid bit, which indicates whether a memory operation is a read type operation or a write type operation. A Data field indicates data to be written by a write operation. The BEN field indicates which bytes of data are enabled for a memory operation. The WRAP field is a wrap bit used for determining an age of a memory operation. In realizations of the invention, the instruction store unit has more entries than the memory disambiguation buffer. For example, assume the MDB is a 64 entry MDB and the ISU includes 128 entries. The wrap bit is utilized to determine whether a memory operation is within the first 64 entries of the ISU or the second 64 entries of the ISU. The VA field indicates an address representation for a memory operation. These various fields are utilized to generate masks and make determinations regarding age and matches for prediction based RAW bypass.

Figure 8:
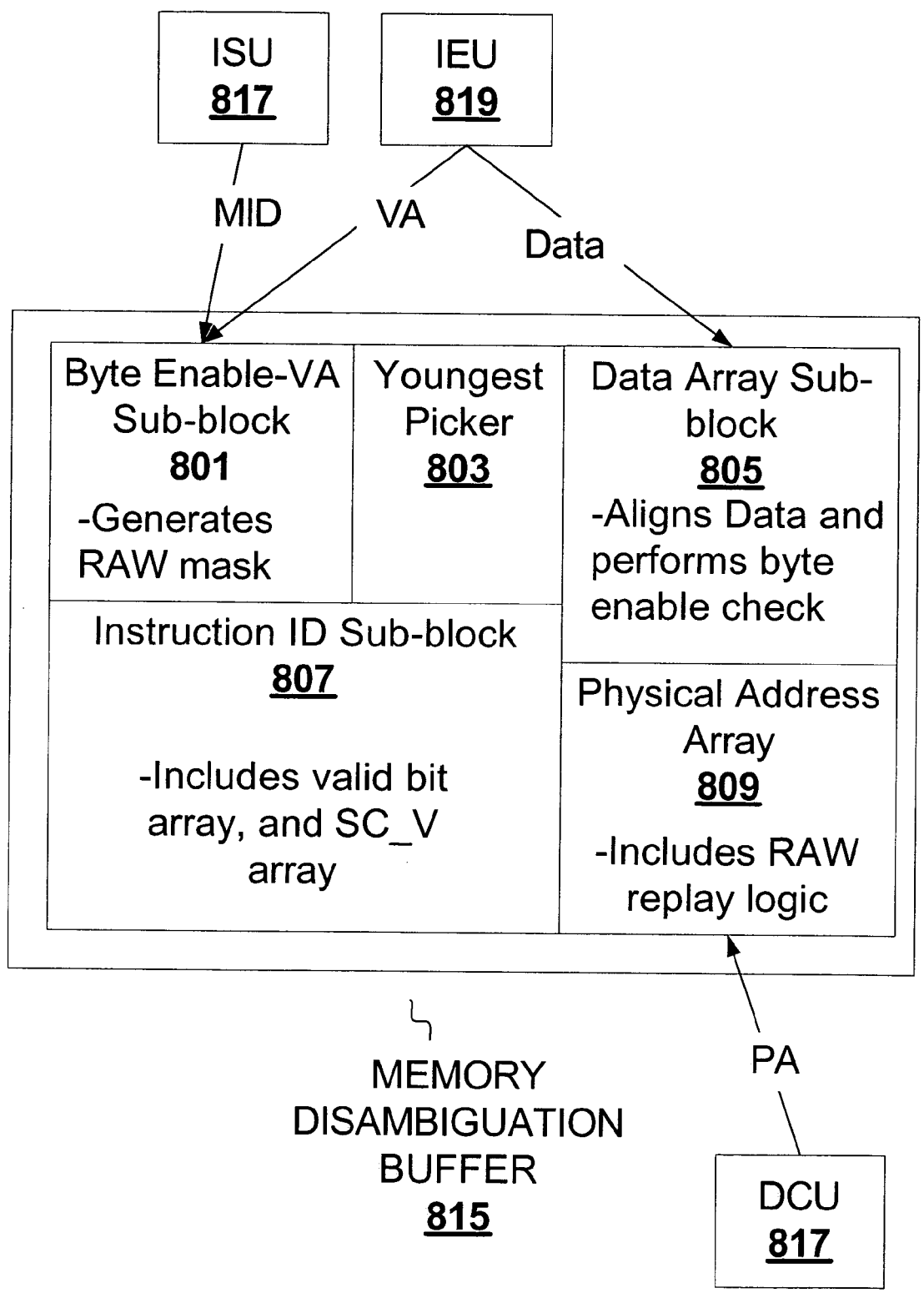
FIG. 8 depicts an exemplary memory disambiguation buffer according to some realizations of the invention.

FIG. 8 depicts an exemplary memory disambiguation buffer according to some realizations of the invention. A MDB 815 includes the following sub-blocks: a byte enable and virtual address sub-block(BVA) 801, a youngest picker sub-block (YP) 803, a data array sub-block (DA) 805, an instruction identifier sub-block (IID) 807, and a physical address array sub-block (PA) 809.

The various blocks of the MDB 815 perform various functions and write various data. The BVA 801 receives MDB indices (mid) for each memory operation from an ISU 817 and receives address representations (e.g., virtual addresses) from an IEU 819. The BVA 801 stores each address representation received from the IEU 819 as long as the corresponding memory operations are resident in the MDB 815. The BVA 801 generates RAW masks from various information. The RAW masks are vectors of information fed into the youngest picker sub-block 803. The RAW masks include information, such as information in the BEN field and the WRAP field for each memory operation entry in the MDB as illustrated in FIG. 7. The BVA 801 includes logic for determining data overlap, matching address representations, and identifying memory operations that are older than an incoming read type operation. The IID 807 maintains the SC_V array, which is fed into the youngest picker sub-block 803, and writes the iid. The IID 807 updates the SC_V array as the MDB 815 receives each memory operation. As previously stated, the SC_V array indicates which entries in the MDB 815 correspond to write type operations and which entries correspond to read type operations. The Youngest Picker sub-block 803 determines the write type operation RAW bypass candidate by selecting the youngest entry out of a given set of entries. The youngest picker 803 performs its determination based on information provided by the BVA sub-block 801 and the IID sub-block 807.

The DA 805 receives write data from the IEU 819. The DA 805 performs data alignment, byte enable check, and provides data and byte enables to caches and the PA sub-block 809. The PA sub-block 809 receives physical addresses from a DCU 817, which are computed when they are issued to the MDB 815. The PA 809 hosts addresses of resident memory operations and includes logic for RAW replay and comparing complete addresses (e.g., with a CAM, SCAM, etc.).

Figure 9:
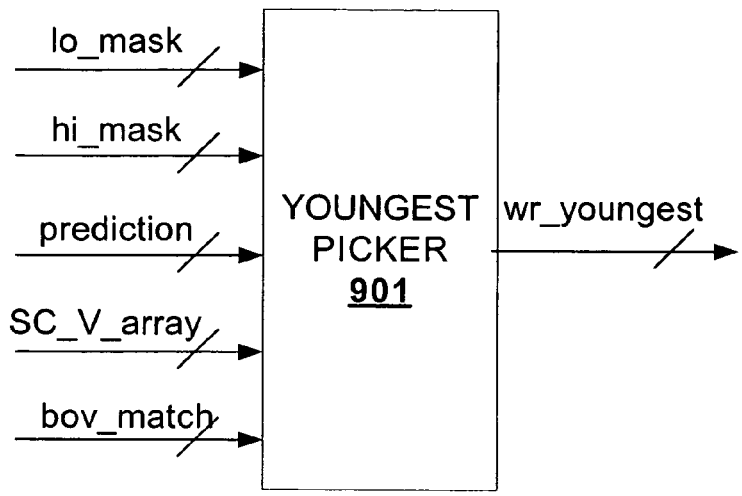
FIG. 9 depicts exemplary logic according to some realizations of the invention.

FIG. 9 depicts exemplary logic according to some realizations of the invention. A youngest picker 901 receives several inputs and determines a youngest write type operation from the inputs. The youngest picker outputs wr_youngest, which indicates the youngest write type operation that is predicted to match a read type operation. The youngest picker 901 receives the following as input: lo_mask, hi_mask, a prediction vector, an SC_V_array, and a bov_match vector. The lo_mask indicates those memory operations in the MDB that are younger than the incoming read type operation and that have a WRAP bit that is the same as the read type operation. The hi mask indicates those memory operations in the MDB that are older than the incoming read type operation and that have a WRAP bit that is the same as the incoming read type operation's WRAP bit. The prediction vector indicates those memory operations that have a predicted address match (i.e., those memory operations with address representations that match the incoming read type operation's address representation). As discussed in FIG. 7, the SC_V array indicates those memory operations that are write type operations. The bov_match vector indicates those memory operations that have been determined to have data overlap with the incoming read type operation. The youngest picker 901 can identify the matching older write type operations with these vectors of information and select the youngest of the identified matching older write type operations.

Figure 10:
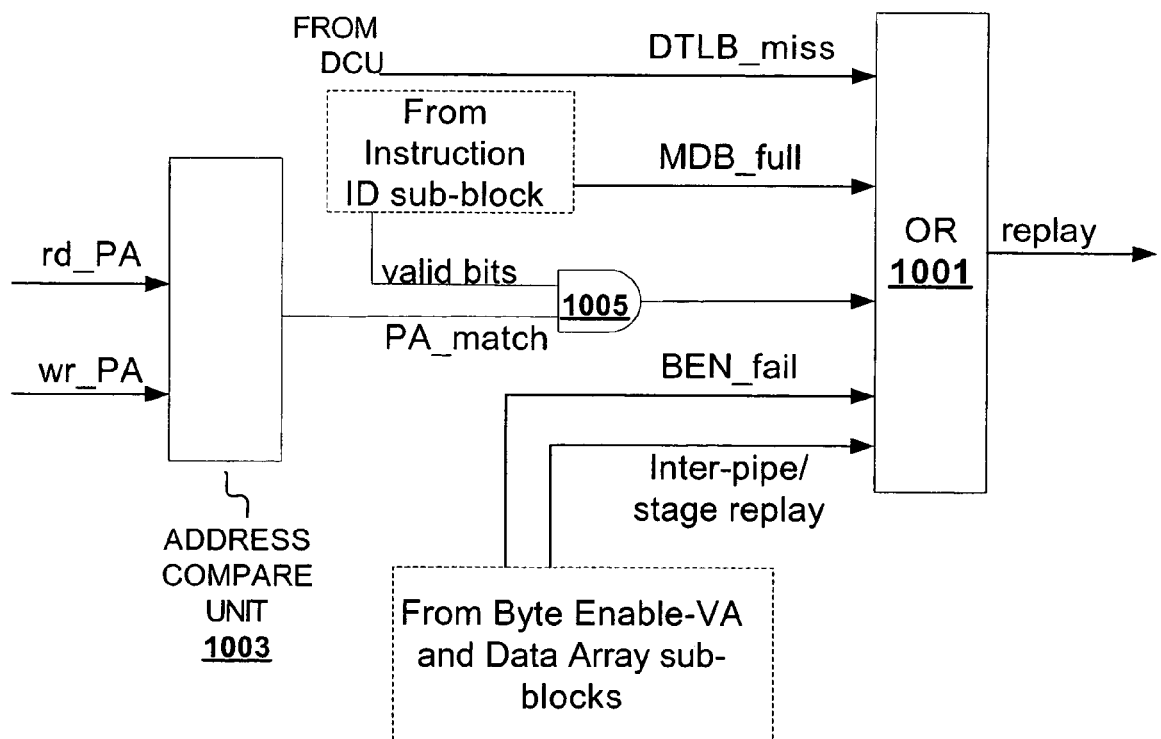
FIG. 10 depicts exemplary logic for generating a replay signal according to some realizations of the invention.

FIG. 10 depicts exemplary logic for generating a replay signal according to some realizations of the invention. In FIG. 10, an address compare unit 1003 (e.g., a CAM) receives physical addresses for a read type operation (the incoming read type operation) and a write type operation (the selected youngest matching older write type operation). A signal PA_match, which indicates whether the physical addresses match, is sent to an AND gate 1005, where the PA_match signal is AND's with a valid bit vector. The valid bit vector indicates whether the corresponding memory operation residing in the memory disambiguation buffer is a valid memory operation. In various realizations of the invention, the valid bit vector depends on conditions including valid instructions from an instruction execution unit, a valid physical address from a data cache unit, a signal indicating that the memory disambiguation buffer is full, etc. The AND of the PA_match and the valid vector flows into an OR gate 1001, where it is OR'd with other signals for various other conditions to cause a replay of the read type operation. If either one or both of the physical addresses cannot be determined (e.g., a data translation lookahead buffer miss), then the DCU sends a DTLB_miss signal to the OR gate 1001 to cause a replay signal. If the MDB is full and the read type operation cannot be inserted into the MDB, then the IID sends an MDB_full signal to the OR gate 1001. If the byte enable check fails, then the DA sends a BEN_fail signal to the OR gate 1001.

Inter-stage or inter-pipe comparison conditions may also result in a replay signal. For inter-pipe comparisons, a read type operation may be issued in the same cycle as a write type operation. The read type operation may match the write type operation, but values for the read type operations, such as the address representation and the BEN bits, may have been computed but not written yet. For inter-stage comparisons, a write type operation may be followed shortly by a read type operation (e.g. within one or two cycles). Under these circumstances, a given number of cycles will pass before the data is written by the write type operation. If RAW bypass is performed between a read type operation that is issued within a certain amount of time of a matching write type operation, the bypassed data may be incorrect because the data has not been written by the write type operation, hence a replay signal is generated when these conditions exist. In FIG. 10, inter-stage and/or inter-pipe replay signals are sent from BVA/DA to the OR gate 1001.

The described invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other type of medium suitable for storing electronic instructions.

Figure 11:
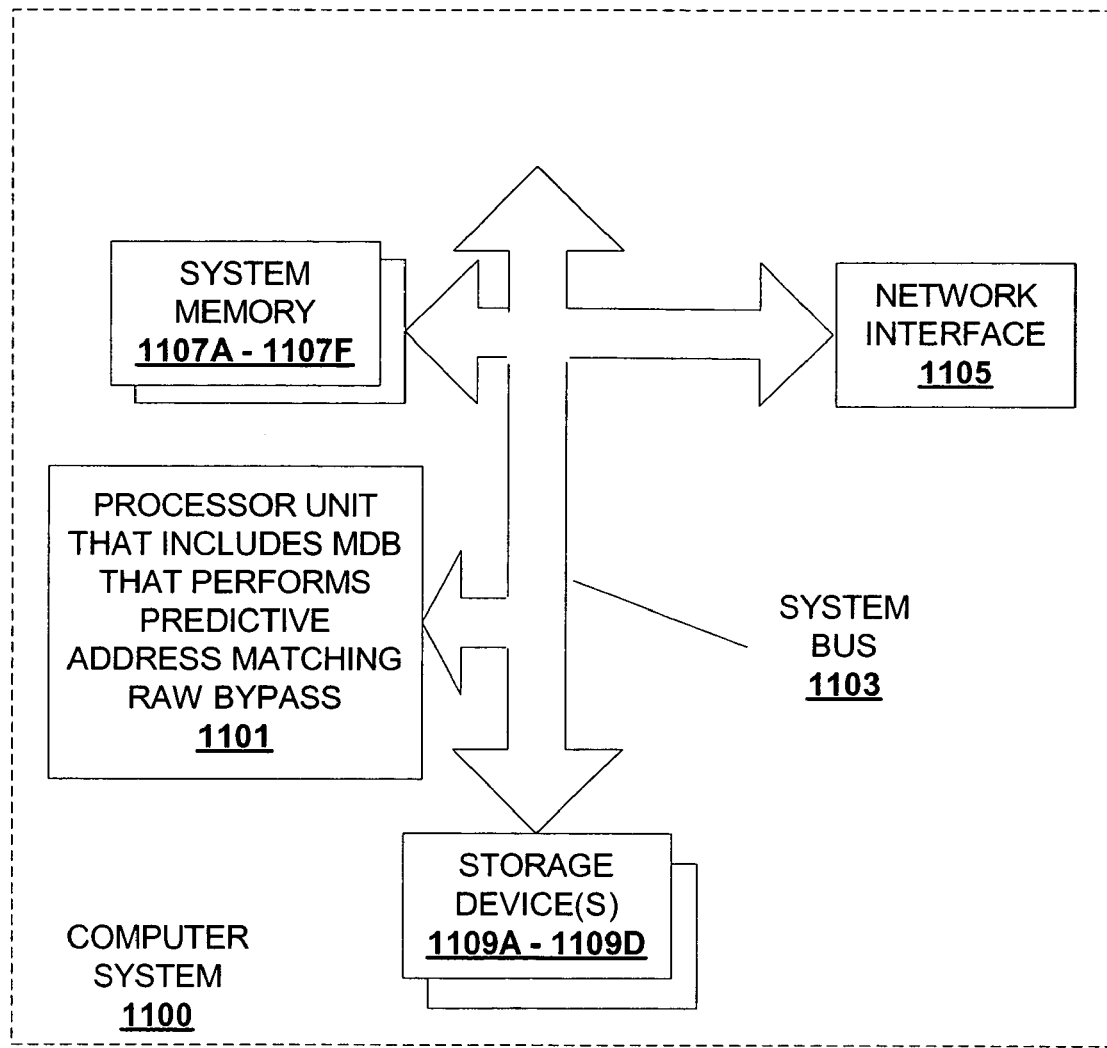
FIG. 11 depicts an exemplary computer system according to some realizations of the invention.

FIG. 11 depicts an exemplary computer system according to some realizations of the invention. A computer system 1100 includes a processor unit 1101 (possibly including multiple processors). The processor unit 1101 includes a memory disambiguation buffer that performs predictive address matching RAW bypass. The computer system 1100 also includes a system memory 1107A-1107F (e.g., one or more of cache, SRAM DRAM, RDRAM, EDO RAM, DDR RAM, EEPROM, etc.), a system bus 1103 (e.g., LDT, PCI, ISA, etc.), a network interface 1105 (e.g., an ATM interface, an Ethernet interface, a Frame Relay interface, etc.), and a storage device(s) 1109A-1109D (e.g., optical storage, magnetic storage, etc.). Realizations of the invention may include fewer or additional components not illustrated in FIG. 11 (e.g., video cards, audio cards, additional network interfaces, peripheral devices, etc.). The processor 1201, the storage device(s) 1109A-1109D, the network interface 1105, and the system memory 1107A-1107F are coupled to the system bus 1103. Although FIG. 11 illustrates the MDB embodied in the processor unit 1101, various realizations of the invention implement described functions differently (e.g., the sub-blocks of the MDB are implemented as separate units, in different units, combined with the various other blocks, etc.).

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of operating a processor comprising:
   predicting a match between targets of a write type operation and a subsequently issued read type operation by comparing a compressed address of the write type operation with a compressed address of the read type operation, wherein the predicting is performed prior to availability of a resolved address target of the read-type operation;
   bypassing data from the write-type operation to the read-type operation based on the predicted match;
   validating the predicted match; and
   responsive to detection of a misprediction, re-executing the read-type operation.

2. The method of claim 1 wherein latency of the predicting and bypassing is no greater than that of a level-1 cache of the processor.

3. The method of claim 1 wherein the latency of the predicting and the bypassing is no greater than N cycles of the processor and wherein latency of address resolution is substantially greater than N cycles.

4. The method of claim 1 wherein the write-type operation is a youngest of a plurality of predicted matching write-type operations that are older than the read-type operation.

5. The method of claim 1 wherein validating comprises determining resolved target addresses of the read and write-type operations as matching.

6. A data hazard resolution unit that predicts an address match between a read type operation and a write type operation by comparing a compressed address of the write type operation with a compressed address of the read type operation, and that performs a read after write (RAW) bypass based on at least the address match prediction.

7. The data hazard resolution unit of claim 6 that also replays the read type operation if the address match prediction is incorrect.

8. The data hazard resolution unit of claim 6 wherein the address match prediction comprises:
   comparing a representation of the read type operation's address against a representation of the write type operation's address; and
   predicting an address match based at least in part on the comparing.

9. The data hazard resolution unit of claim 8 wherein the address match prediction also comprises:
   comparing the representation of the read type operation's address and representations of addresses of a set of write type operations that are older than the read type operation; and
   selecting the write type operation as a youngest of the set of old write type operations with a compressed address that matches the read type operation's address representation.

10. The data hazard resolution unit of claim 8 wherein the comparing is performed with a summing content addressable memory.

11. The data hazard resolution unit of claim 8 wherein the address representations include one or more of virtual addresses, virtual address tags, hashes of physical addresses, and hashes of virtual addresses.

12. The data hazard resolution unit of claim 6 wherein the RAW bypass and the address match prediction is performed within cycles sufficient to determine the read and write type operations' actual addresses.

13. The data hazard resolution unit of claim 6 that compares the read type operation's physical address against the write type operation's physical address to determine if the address match prediction is correct.

14. The data hazard resolution unit of claim 13 that accesses a translation lookaside buffer to compute the write type operation's physical address.

15. The data hazard resolution unit of claim 13 that receives the read type operation's physical address from a data cache unit.

16. The data hazard resolution unit of claim 15 wherein the data cache unit accesses an address translation unit to compute the read type operation's physical address.

17. The data hazard resolution unit of claim 13 that compares the physical addresses with a content addressable memory.

18. A method of read after write (RAW) bypass comprising:
   predicting a match between targets of a write type operation and a subsequently issued read type operation by comparing a compressed address of the write type operation with a compressed address of the read type operation wherein a first memory location information of the write-type operation is available prior to a second memory location information of the read-type operation; and
   performing a RAW bypass for the read type operation with the write type operation's data based at least in part on the predicting that the address representation of the read type operation matches the address representation of the write-type operation.

19. The method of claim 18 wherein a first memory location of the read type operation is a partial portion of a second memory location information of the read type operation.

20. The method of claim 19 wherein the read-type operation's memory location is a subset of bits of the read-type operation's second memory location, which is a virtual address.

21. The method of claim 18 further comprising:
   determining if the read-type operation's second memory location information matches the write-type operation's second memory location information, if the write-type operation's first memory location information matches the read-type operation's first memory location information, upon availability of the read-type operation's second memory location information; and
   causing the read type operation to be re-executed if the second memory location information of both operations do not match.

22. The method of claim 21 wherein the determining a match between the second memory location information is performed with a content addressable memory, wherein the content addressable memory at least hosts the write-type operation's second memory location information.

23. The method of claim 18 wherein the determining a match between the read-type operation's first memory location information and the write-type operation's first memory location information and performing the RAW bypass is done prior to availability of the read-type operation's second memory location information.

24. The method of claim 18 wherein the first memory location information includes one or more of virtual addresses, virtual address tags, hashes of virtual addresses, and hashes of physical addresses.

25. The method of claim 23 wherein the determining a match between the first memory location information comprises:
identifying a set of memory operations with first memory location information that matches the read type operation's memory location information;
identifying those of the set of memory operations that are older than the read type operation;
identifying those of the set of memory operations that are write type memory operations; and
selecting the write type operation as the youngest of the identified older matching write type operations.

26. The method of claim 25 further comprising generating vectors of information that indicate the identified information.

27. The method of claim 18 wherein the determining a match between the first memory location information is performed with a summing content addressable memory, wherein the summing content addressable memory at least hosts the write-type memory operation's first memory location information.

28. The method of claim 18 embodied as a computer program product that is encoded on one or more machine-readable computer storage media.

29. A method of read after write (RAW) bypass comprising:
selecting a write type operation based on a predictive address match between a compressed address of a read type operation and a compressed address of the write type operation in a first clock cycle; and
bypassing data of the write type operation for the read type operation in a second clock cycle.

30. The method of claim 29 wherein the predictive address match comprises:
comparing a representation of the write type operation's address and a representation of the read type operation's address, wherein the address representations are smaller than the operation's actual addresses; and
predicting a match between the addresses based at least in part on the address representations matching.

31. The method of claim 30 wherein address representation includes virtual address, virtual address tag, compressed address, hashed virtual address, and hashed physical address.

32. The method of claim 29 wherein the predictive address match comprises:
comparing a representation of the read type operation's address against representations of a set of old write type operations' addresses;
selecting the write type operation as a youngest of the set of old write operations with a compressed address that matches the read type operation's address representation; and
predicting a match between the youngest write type operation's address and the read type operation's address.

33. The method of claim 32 wherein the comparing is performed by a content addressable memory (CAM).

34. The method of claim 33 wherein the CAM includes a summing CAM.

35. The method of claim 29 further comprising determining that the selected write type operation provides data that overlaps with the data requested by the read type operation.

36. The method of claim 29 further comprising:
determining if the selected write type operation provides the data requested by the read type operation; and
replaying the read type operation if the selected write type operation does not provide the request data.

37. The method of claim 29 further comprising:
comparing the read type operation's actual address against the selected write type operation's actual address;
determining if the predictive address match was correct based at least in part on the comparing; and
replaying the read type operation if the predictive address match is determined as incorrect.

38. The method of claim 29 embodied as a computer program product that is encoded on one or more machine-readable computer storage media.

39. A processor to predict a match between targets of a write type operation and a subsequently issued read type operation by comparing a compressed address of the write type operation with a compressed address of the read type operation, and to perform read after write bypass based at least in part on match predictions of the address representations.

40. The processor of claim 39 wherein a first address representation is a partial portion of a second address representation.

41. The processor of claim 39 that comprises a data hazard resolution unit.

42. The processor of claim 41 wherein the data hazard resolution unit includes a memory disambiguation buffer and a memory reorder buffer.

43. The processor of claim 39 wherein first address representations include one or more of virtual addresses, virtual address tags, subset of virtual addresses, compressed addresses, hashed virtual addresses, and hashed physical addresses.

44. The processor of claim 39 that verifies the address match prediction.

45. The processor of claim 44 that includes a content addressable memory to verify the address match prediction.

46. The processor of claim 44 that verifies the address match prediction with the corresponding second address representations.

47. The processor of claim 44 that determines if the write type operation provides data sufficient for the read type operation.

48. The processor of claim 47 that replays the read type operation if the address match prediction is a misprediction or if the write type operation does not provide sufficient data.

49. An apparatus comprising:
a register file; and
a memory operations buffer coupled to the register file, the memory operations buffer to perform read after write (RAW) bypass based at least in part on comparing a compressed address of a write type operation with a compressed address of a read type operation.

50. The apparatus of claim 49 further comprising a translation lookahead buffer (TLB) to determine physical addresses.

51. The apparatus of claim 50 further comprising:
- a data cache unit to provide a complete address for the read type operation, and
- the memory operations buffer to compare the read type operation's complete addresses from the data cache unit and the complete address of the write type operation computed by the TLB, and to verify predictive address matches based at least in part on comparisons of complete addresses.

52. The apparatus of claim 49 further comprising a summing content addressable memory (CAM) to determine matches between partial addresses.

53. The apparatus of claim 49 further comprising a CAM to determine matches between complete addresses.

54. The apparatus of claim 49 further comprising a memory management unit that comprises the memory operations buffer.

55. The apparatus of claim 49 wherein the memory operations buffer includes a memory disambiguation buffer.

56. The apparatus of claim 51 comprising the memory operations buffer to replay read type operations based at least in part on determining a predictive address match to be incorrect.

57. An apparatus comprising:
- one or more queues to host read and write type memory operations;
- means for predicting an address match between a write type memory operation and a read type memory operation by comparing a compressed address of the write type operation with a compressed address of the read type operation; and
- means for performing read after write bypass based on the predicted address match.

58. The apparatus of claim 57 further comprising means for replaying the read type memory operation if the predicted address match is a misprediction.

59. The apparatus of claim 57 further comprising means for determining if the write type memory operation provides data sufficient for the read type memory operation and replaying the read type memory operation if the data provided by the write type memory operation is determine insufficient.

60. A memory disambiguation buffer that includes the apparatus of claim 57.

61. An apparatus comprising:
- a memory buffer that includes, a plurality of entries to store memory operations, a first sub-block to predict address matches between an incoming read type operation and resident write type operations that are older than an incoming read type memory operation by comparing a compressed address of the write type operation with a compressed address of the read type operation, and a youngest picker to select a write type operation as a youngest of write type operations that are older than the incoming read type memory operation; and
- an execution unit.

62. The apparatus of claim 61 wherein the first sub-block includes a summing content addressable memory to compare address representation of memory operations against an incoming read type memory operation.

63. The apparatus of claim 61 wherein the first sub-block includes logic to identify age of memory operations with respect to an incoming read type operation.

64. The apparatus of claim 61 wherein the first sub-block includes logic to determine if resident memory operations provide at least a portion of data requested by the read type operation.

65. The apparatus of claim 61 wherein the memory buffer further includes a second sub-block to distinguish between read type memory operations and write type memory operations.

66. The apparatus of claim 61 wherein the memory buffer further comprises a second sub-block to determine if RAW bypass candidate write type operation provides sufficient data for corresponding read type operation.

67. The apparatus of claim 61 wherein the memory buffer further comprises a second sub-block to verify address match predictions of the first sub-block.

68. The apparatus of claim 67 wherein the second sub-block further comprises a content addressable memory to compare addresses.

* * * * *